(12) United States Patent
Iwasa et al.

(10) Patent No.: US 8,733,506 B2
(45) Date of Patent: May 27, 2014

(54) VEHICLE DIFFERENTIAL DEVICE

(75) Inventors: Tomoatsu Iwasa, Toyota (JP);
Yoshichika Shimane, Toyota (JP);
Mizuki Imafuku, Toyota (JP); Yuichi Usui, Kariya (JP); Hideya Osawa, Chiryu (JP); Yohei Takahashi, Nukata-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 13/518,519

(22) PCT Filed: Dec. 25, 2009

(86) PCT No.: PCT/JP2009/071696
§ 371 (c)(1),
(2), (4) Date: Aug. 23, 2012

(87) PCT Pub. No.: WO2011/077578
PCT Pub. Date: Jun. 30, 2011

(65) Prior Publication Data
US 2013/0000443 A1    Jan. 3, 2013

(51) Int. Cl.
*F16H 57/037*    (2012.01)
(52) U.S. Cl.
USPC ........................................................ 184/6.12
(58) Field of Classification Search
USPC .......................... 184/6.12; 123/196 R; 74/607
See application file for complete search history.

(56) References Cited

U.S. PATENT DOCUMENTS

2005/0064976 A1    3/2005    Mano et al.

FOREIGN PATENT DOCUMENTS

| | | |
|---|---|---|
| CN | 1619189 A | 5/2005 |
| JP | U-3-44261 | 4/1991 |
| JP | U-5-71524 | 9/1993 |
| JP | U-7-20458 | 4/1995 |
| JP | A-7-223452 | 8/1995 |
| JP | A-2008-138780 | 6/2008 |
| KR | 20080008745 A | 1/2008 |

OTHER PUBLICATIONS

International Search Report issued in International Patent Application No. PCT/JP2009/071696 dated Apr. 6, 2010.

*Primary Examiner* — William E Dondero
*Assistant Examiner* — Mark K Buse
(74) *Attorney, Agent, or Firm* — Oliff PLC

(57) ABSTRACT

A vehicle differential device having a differential case rotatably supported via a bearing by a housing and a drive shaft inserted into the differential case, including an oil sump member on the opposite side of the differential case to the bearing, the oil sump member including an insert hole into which the drive shaft is inserted, and an oil supply channel formed higher than the drive shaft in the vertical direction, wherein at least a portion of the insert hole is formed with a gap between the insertion hole and the drive shaft wider than that on the vertically lower side of the rotational axis of the drive shaft, the oil sump member includes a discharge hole allowing oil to flow out toward the differential case if an oil level of an oil chamber formed between the oil sump member and an oil seal exceeds a predetermined height.

1 Claim, 5 Drawing Sheets

VEHICLE DIFFERENTIAL DEVICE

TECHNICAL FIELD

The present invention relates to a vehicle differential device and particularly to improvement for realizing efficient lubrication for a driveshaft bearing portion.

BACKGROUND ART

A vehicle differential device (differential gear) including a differential case rotatably supported via a bearing by a housing and a drive shaft inserted into the differential case is used in a power transmission path of various vehicles. The differential device includes, for example, a ring gear having outer circumferential teeth and disposed in the housing; the differential case integrally disposed with the ring gear and rotating around one shaft center; a pinion gear rotatably supported around a shaft center orthogonal to the one shaft center by a pinion shaft fixed to the differential case within the differential case; and a pair of side gears facing each other with the pinion gear interposed therebetween and disposed rotatably relative to each other around the one shaft center within the differential case, and the differential device allocates a drive force to a pair of drive shafts (axles) corresponding to left and right drive wheels coupled to the pair of the side gears while allowing differential rotation.

The differential device as described above is required to supply sufficient oil to portions in need of lubrication. To implement the lubrication, for example, techniques have been proposed such as a lubricating structure of a differential device described in Patent Document 1. According to this technique, lubrication oil can stably be ensured from low rotation to high rotation to improve lubrication performance by introducing the oil into a chamber and guiding and supplying the oil dripping from an opening by an oil guide to rear surface portions of bearings to lubricate the bearings and an inboard portion (differential case).

PRIOR ART DOCUMENT

Patent Document

Patent Document 1: Japanese Laid-Open Patent Publication No. 2008-138780

SUMMARY OF THE INVENTION

Problem to be Solved by the Invention

However, in the conventional technique, particularly if a rotation speed of a differential case becomes relatively high, an increased amount of oil is sucked by the bearings and oil supply may be insufficient in a drive shaft bearing portion, i.e., between an insertion hole of the differential case into which the drive shaft is inserted and the drive shaft. Therefore, it is required to develop a vehicle differential device enabling efficient lubrication for the drive shaft bearing portion.

The present invention was conceived in view of the situations and it is therefore an object of the present invention to provide a vehicle differential device enabling efficient lubrication of the drive shaft bearing portion.

Means for Solving the Problems

To achieve the object, the present invention provides a vehicle differential device having a differential case rotatably supported via a bearing by a housing and a drive shaft inserted into the differential case, comprising: an oil sump member on the opposite side of the differential case to the bearing, the oil sump member including an insert hole into which the drive shaft is inserted, and an oil supply channel formed higher than the drive shaft in the vertical direction, wherein at least a portion of the insert hole is formed with a gap between the insertion hole and the drive shaft wider than that on the vertically lower side of the rotational axis of the drive shaft, the oil sump member includes a discharge hole allowing oil to flow out toward the differential case if an oil level of an oil chamber formed between the oil sump member and an oil seal exceeds a predetermined height, the discharge hole being formed at a site corresponding to a phase circumferentially different from a site corresponding to the oil supply channel.

The Effects of the Invention

Consequently, since the vehicle differential device includes an oil sump member on the opposite side of the differential case to the bearing, the oil sump member including an insert hole into which the drive shaft is inserted, an oil supply channel formed higher than the drive shaft in the vertical direction, wherein at least a portion of the insert hole is formed with a gap between the insertion hole and the drive shaft wider than that on the vertically lower side of the rotational axis of the drive shaft, the oil sump member includes a discharge hole allowing oil to flow out toward the differential case if an oil level of an oil chamber formed between the oil sump member and an oil seal exceeds a predetermined height, the discharge hole being formed at a site corresponding to a phase circumferentially different from a site corresponding to the oil supply channel, the oil sump member can restrain the oil supplied on the lower side of the drive shaft from being excessively sucked by the bearing and sufficient oil can be supplied between the drive shaft and the differential case with the oil sump member as a guide. And, if oil is accumulated too much in the oil chamber, the oil can be released toward the differential case to supply sufficient oil to another portion in need of lubrication, and, in addition, the oil supplied from the oil supply channel can be restrained from directly flowing into the discharge holes and the oil chamber can accumulate necessary and sufficient oil. Therefore, the vehicle differential device enabling efficient lubrication of the drive shaft bearing portion can be provided.

MODE FOR CARRYING OUT THE INVENTION

A preferred embodiment of the present invention will now be described in detail with reference to the drawings.

Embodiment

Figure 1:
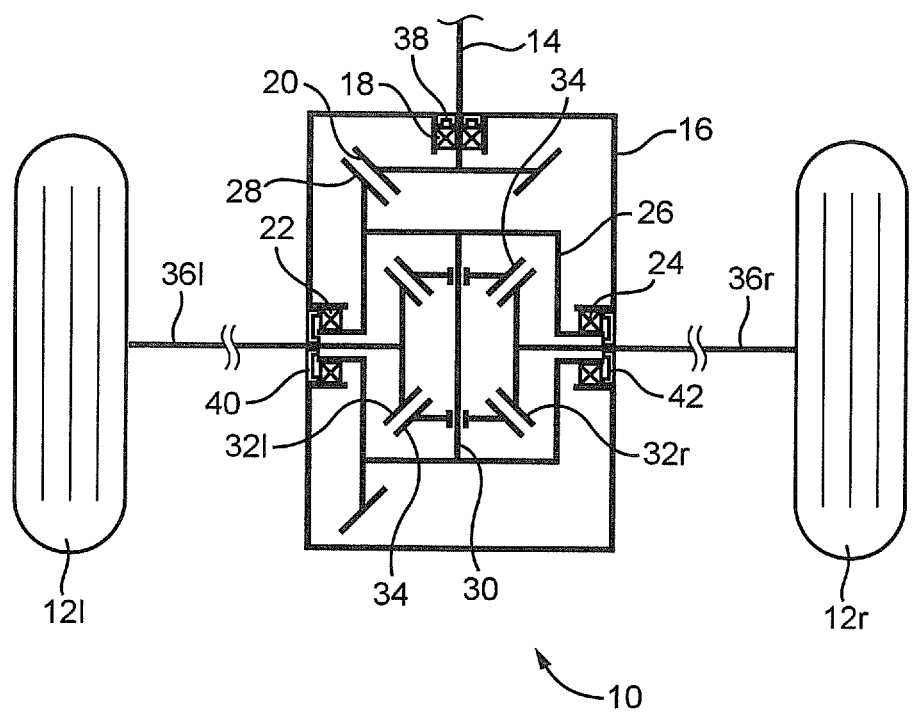
FIG. 1 is a schematic of a vehicle differential device to which the present invention is preferably applied.

FIG. 1 is a schematic of a vehicle differential device 10 to which the present invention is preferably applied. The differential device 10 depicted in FIG. 1 is a differential device (differential gear device) disposed correspondingly to a pair of left and right rear wheels 12*l*, 12*r* that are drive wheels, for example, and allocating a drive force transmitted via an input shaft (differential input shaft) 14 to the pair of the rear wheels 12*l*, 12*r* while allowing differential rotation of the pair of the rear wheels 12*l*, 12*r*. The input shaft 14 is coupled via a free joint to a shaft end of a propeller shaft, for example, and is configured such that a drive force output by a drive force source not depicted is input via a transmission and the propeller shaft to the input shaft 14.

As depicted in FIG. 1, the differential device 10 includes, in a housing (case) 16 that is a non-rotating member, the input shaft 14 supported rotatably (around its own axis) relative to the housing 16 with a bearing 18 interposed between the input shaft 14 and the housing 16; a small-diameter bevel gear 20 coupled to an end portion of the input shaft 14 on the inside of the housing 16; a shell-like differential case (differential case) 26 supported rotatably (around its own axis) around a shaft center orthogonal to the shaft center of the input shaft 14 with bearings 22, 24 interposed between the differential case 26 and the housing 16; a large-diameter bevel gear 28 fixed to an outer circumferential portion of the differential case 26 by a bolt etc., and engaged with the small-diameter bevel gear 20; a pinion shaft 30 supported at both end portions by the differential case 26 and fixed to the differential case 26 by a knock-pin in a posture orthogonal to the rotational shaft center of the differential case 26; a pair of side gears 32*l*, 32*r* (hereinafter simply referred to as side gears 32 if not particularly distinguished) facing each other with the pinion shaft 30 interposed therebetween and supported rotatably (around its own axis) around its shaft center by the differential case 26; and a pair of pinion gears 34 penetrated by the pinion shaft 30 to be supported rotatably (around its own axis) by the pinion shaft 30 and respectively engaged with a pair of the side gears 32*l*, 32*r*.

In the differential device 10, the side gear 32*l* is coupled to a left-wheel drive shaft 36*l* corresponding to the rear left wheel 12*l*, and the side gear 32*r* is coupled to a right-wheel drive shaft 36*r* (hereinafter simply referred to as drive shafts 36 if not particularly distinguished) corresponding to the rear right wheel 12*r*. Oil (lubricant oil) for lubrication of the portions is enclosed in the housing 16 of the differential device 10. Therefore, an oil seal 38, an oil seal 40, and an oil seal 42 are disposed between the input shaft 14 and the housing 16 near the bearing 18, between the drive shaft 36*l* and the housing 16 near the bearing 22, and between the drive shaft 36*r* and the housing 16 near the bearing 24, respectively, so as to prevent the oil accumulated in the housing 16 from flowing out.

Figure 2:
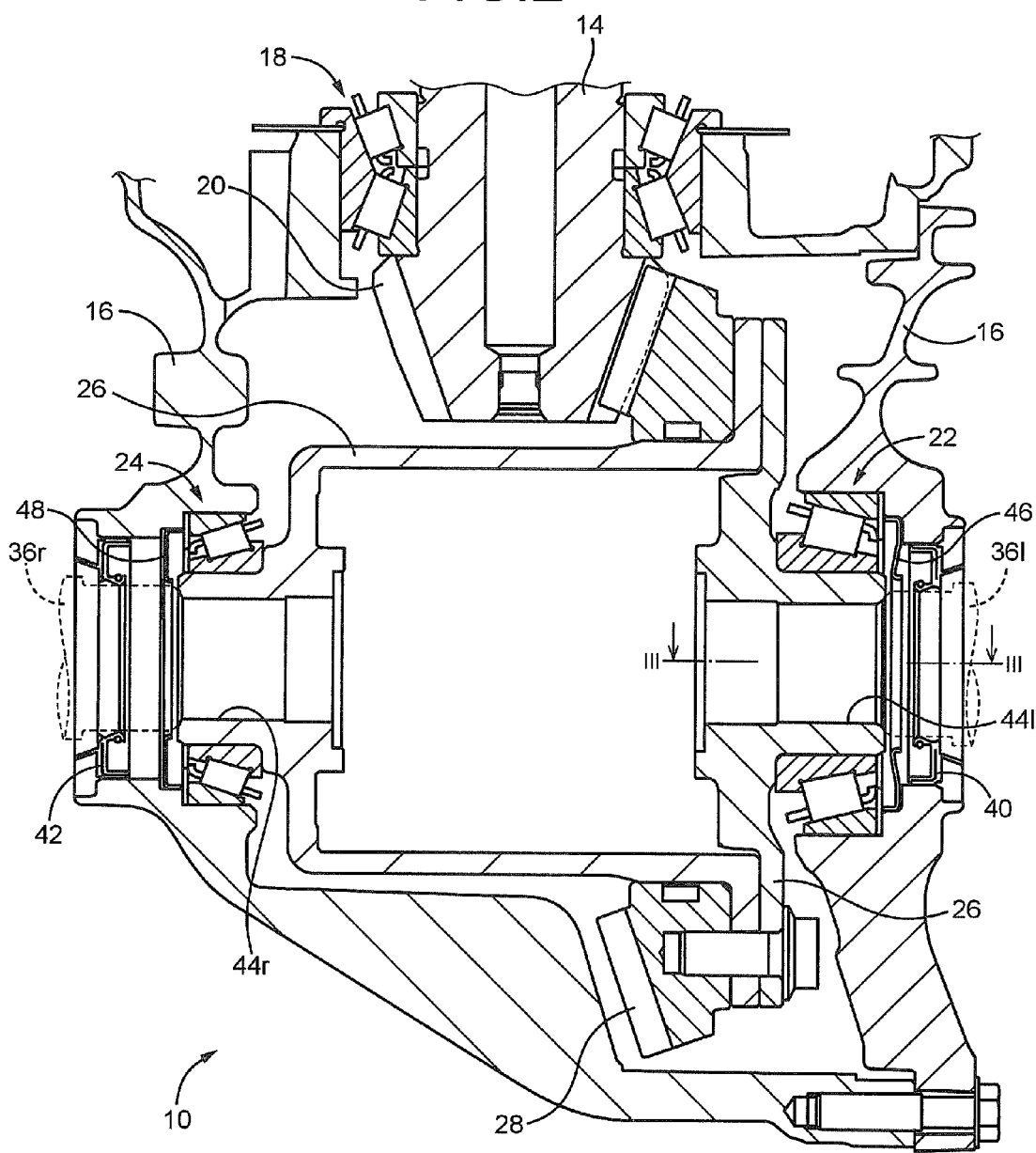
FIG. 2 is a diagram for explaining the configuration of the vehicle differential device of FIG. 1 in detail and is a cross-sectional view of a cross-section acquired by cutting along a plane including the rotational shaft center of the differential case when viewed from the lower side of the device.

FIG. 2 is a diagram for explaining the configuration of the differential device 10 in detail and is a cross-sectional view of a cross-section acquired by cutting along a plane including the rotational shaft center of the differential case 26 when viewed from the lower side of the device. In FIG. 2, the configuration of the pinion shaft 30, the side gears 32, and the pinion gears 34 disposed in the differential case 26 is not depicted and the drive shafts 36 are indicated by dashed lines. As depicted in FIG. 2, in the differential device 10 of this embodiment, a pair of conical roller bearings (tapered roller bearings) facing each other is disposed as the bearing 18 between the housing 16 and the input shaft 14 and supports the input shaft 14 rotatably (around its own axis) relative to the housing 16. Pairs of conical roller bearings (tapered roller bearings) facing each other with the differential case 26 interposed therebetween are disposed as the bearings 22, 24 between the housing 16 and the drive shafts 36 and support the respective corresponding drive shafts 36 rotatably (around its own axis) relative to the housing 16.

As depicted in FIG. 2, through-holes 44*l*, 44*r* (hereinafter simply referred to as through-holes 44 if not particularly distinguished) for inserting the drive shafts 36*l*, 36*r* are respectively formed in portions of the differential case 26 corresponding to the drive shafts 36*l*, 36*r* and the drive shafts 36 are inserted into the respective corresponding through-holes 44 in a relatively rotatable manner and are coupled at the end portions inside the differential case 26 to the side gears 32. Therefore, in the differential device 10 depicted in FIG. 2, the inner circumferential surfaces of the through-holes 44 formed in the differential case 26 correspond to drive shaft bearing portions (drive shaft supporting portions) supporting the drive shafts 36 rotatably (around its own axis).

As depicted in FIG. 2, oil sump members 46, 48 for accumulating the oil (lubricant oil) supplied near the oil seals 40, 42 are disposed in the vicinities of the respective oil seals 40, 42 disposed correspondingly to the drive shafts 36*l*, 36*r*. The oil sump member 46 is disposed in the vicinity of the oil seal 40 in accordance with the configuration of the left-wheel drive shaft 36*l* and the bearing 22, and the oil sump member 48 is disposed in the vicinity of the oil seal 42 in accordance with the configurations of the right-wheel drive shaft 36*r* and the bearing 24. Although the both oil sump members 46, 48 have a configuration described later and produce equivalent effects, the configuration and effect of the oil sump member 46 disposed correspondingly to the bearing 22 and the left-wheel drive shaft 36*l* will solely be described in detail in the following description.

Figure 3:
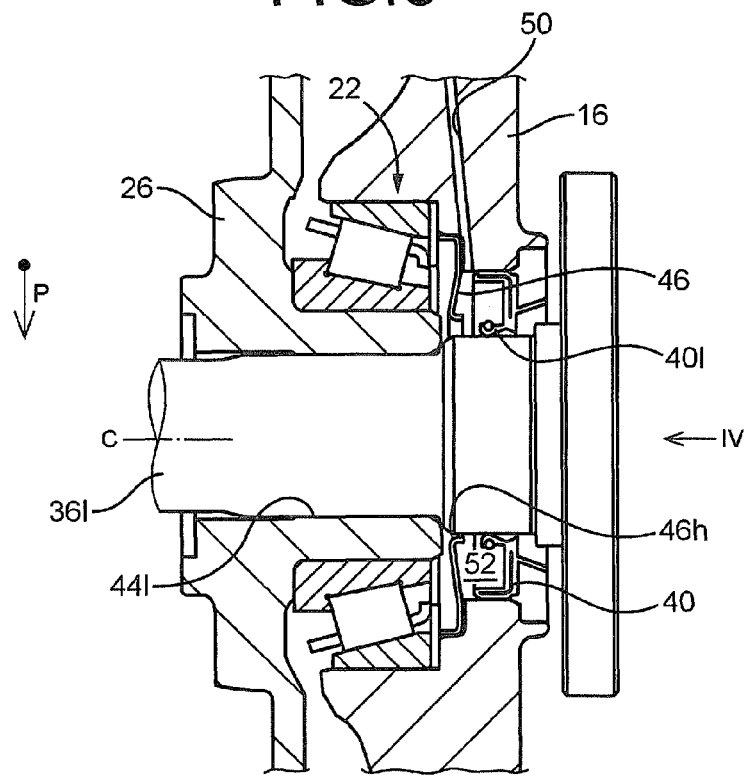
FIG. 3 is a cross-sectional diagram taken along of FIG. 2 and a diagram for explaining the configuration near the bearing in detail.
Figure 4:
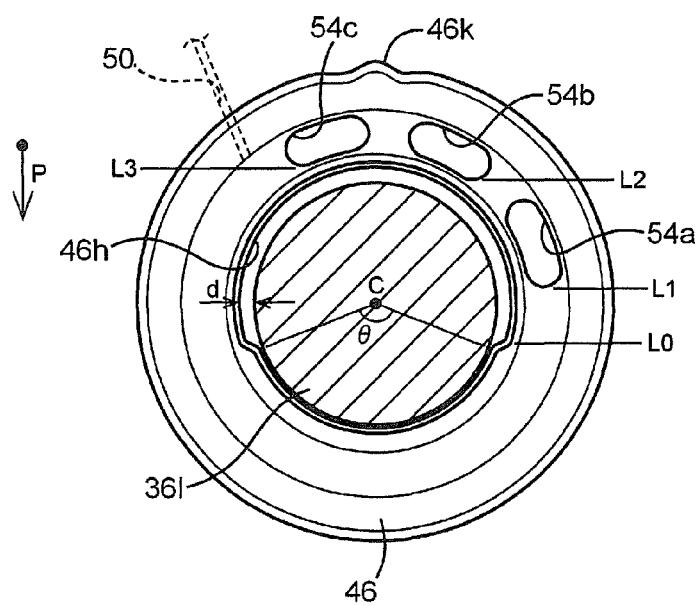
FIG. 4 is a diagram of the oil sump member of FIG. 3 viewed in the direction of an arrow IV and also depicts a cross-section of the drive shaft etc.

FIG. 3 is a cross-sectional diagram taken along of FIG. 2 and a diagram for explaining the configuration near the bearing 22 of the differential device 10 in detail. FIG. 4 is a diagram of the oil sump member 46 of FIG. 3 viewed in the direction of an arrow IV and also depicts a cross-section of the drive shaft 36*l* etc. As depicted in FIGS. 3 and 4, the oil sump member 46 is an annular plate member (circular ring plate) having an insert hole 46*h* at the center and is pressed into the opposite side of the differential case 26 to the bearing 22. In the differential device 10, the drive shaft 36*l* is assembled such that the drive shaft 36*l* is inserted into the insert hole 46*h*. In other words, the oil sump member 46 is assembled on the outer circumferential side of the drive shaft 36*l* so as to be substantially orthogonal to the shaft center of the drive shaft 36*l*.

As depicted in FIG. 3, the housing 16 has an oil supply channel 50 formed higher than the drive shaft 36*l* in the vertical direction indicated by an arrow P of FIG. 3 for supplying oil (lubricant oil) to the constituent elements such as the bearing 22. The oil supply channel 50 guides oil circulated within the housing 16 in accordance with the drive of the differential device 10 and is configured such that the oil flowing out from the oil supply channel 50 is supplied substantially toward a rip portion 40*l* of the oil seal 40 as depicted in FIG. 3. The differential device 10 of this embodiment has an oil chamber (oil sump) 52 formed between the oil sump member 46 and the oil seal 40 configured as described above and the oil supplied from the oil supply channel 50 is accumulated in the oil chamber 52.

As depicted in FIG. 4, at least a portion of the insert hole 46h in the oil sump member 46 is formed such that a gap (clearance) between the insert hole 46h and the drive shaft 36l becomes wider than that on the vertically lower side of the rotational shaft center C of the drive shaft 36l. In other words, the insert hole 46h is configured with a relatively small inner diameter on the lower side of the drive shaft 36l and a relatively large inner diameter of the other portion. Preferably, as depicted in FIG. 4, the insert hole 46h is configured such that a gap between the insert hole 46h and the drive shaft 36l is narrowed as much as possible for a portion corresponding to a center angle of θ degrees centering on a position vertically below the rotational axis (shaft center) C of the drive shaft 36l while a gap between the insert hole 46h and the drive shaft 36l is set to a predetermined width dimension d for the remaining portion corresponding to a center angle of 180-θ degrees. The outer circumferential portion of the oil sump member 46 has a key portion 46k formed to fix a circumferential position of the oil sump member 46 relative to the housing 16, and the engagement of the key portion 46k with a corresponding site of the housing 16 prevents the oil sump member 46 from rotating relative to the housing 16 and determines a relative positional relationship with the drive shaft 36l etc., in the vertical direction.

As depicted in FIG. 4, the oil sump member 46 includes one or more (in FIG. 4, three) discharge holes 54a, 54b, 54c (hereinafter simply referred to as discharge holes 54 if not particularly distinguished) allowing oil to flow out toward the differential case 26 if an oil level i.e., an oil surface of the oil chamber 52 formed between the oil sump member 46 and the oil seal 40 exceeds a predetermined height. Specifically, the oil sump member 46 is configured such that the oil flows out (is discharged) toward the differential case 26 from the discharge hole 54a if the oil level of the oil chamber 52 exceeds L1, from the discharge hole 54b if the oil level of the oil chamber 52 exceeds L2, and from the discharge hole 54c if the oil level of the oil chamber 52 exceeds L3. Although the insert hole 46h (the gap between the insert hole 46h and the drive shaft 36l) configured as described above allows the oil to flow out toward the differential case 26 when the oil level of the oil chamber 52 exceeds L0, the discharge holes 54 fulfill a function of efficiently releasing the oil toward the differential case 26 if the oil is accumulated too much in the oil chamber 52 for some reason. As described later, if the oil is sucked by the bearing 22, the discharge holes 54 act as escape routes of air.

As described in FIG. 4, each of the discharge holes 54 is formed at a position different from a site corresponding to the oil supply channel 50 (a supply port thereof) formed in the housing 16. In other words, the discharge holes 54 are formed to be located on the diagonal (symmetric position) side of the oil supply channel 50 formed in the housing 16. The discharge holes 54 are formed at a site corresponding to a phase circumferentially different from the oil supply channel 50 formed in the housing 16.

An effect of the configuration of the embodiment including the oil sump member 46 as described above will be described by comparison with FIG. 5 depicting a conventional configuration without the oil sump member 46. The differential device 10 has a problem of lubrication of the drive shaft bearing portion surrounded by a dashed line depicted in FIG. 5, i.e., between the through-hole (insert hole) 44l of the differential case 26 into which the drive shaft 36l is inserted and the drive shaft 36l. Specifically, in the conventional configuration depicted in FIG. 5, the oil supplied from the oil supply channel 50 follows a path indicated by a white arrow of a dashed line and is supplied into a space between the oil seal 40 and the bearing 22. The oil is supplied to the drive shaft bearing portion on the condition that a supplied amount of oil supplied into the space is greater than a discharged amount of oil discharged from the space. However, particularly when the rotation speed of the differential case 26 is relatively high, an increased amount of oil may be sucked by the bearing 22 and the oil supplied from the oil supply channel 50 may be sucked by the bearing 22 without sufficient supply to the drive shaft bearing portion, resulting in insufficient lubrication in the drive shaft bearing portion.

Figure 5:
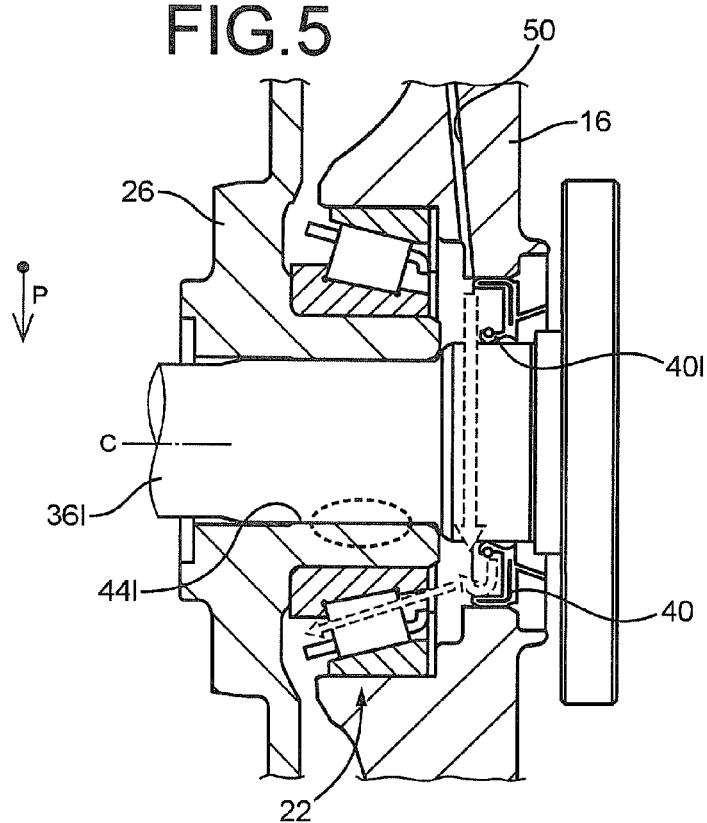
FIG. 5 is a diagram for explaining a problem of the oil supply to the drive shaft bearing portion by the vehicle differential device in the conventional technique.
Figure 6:
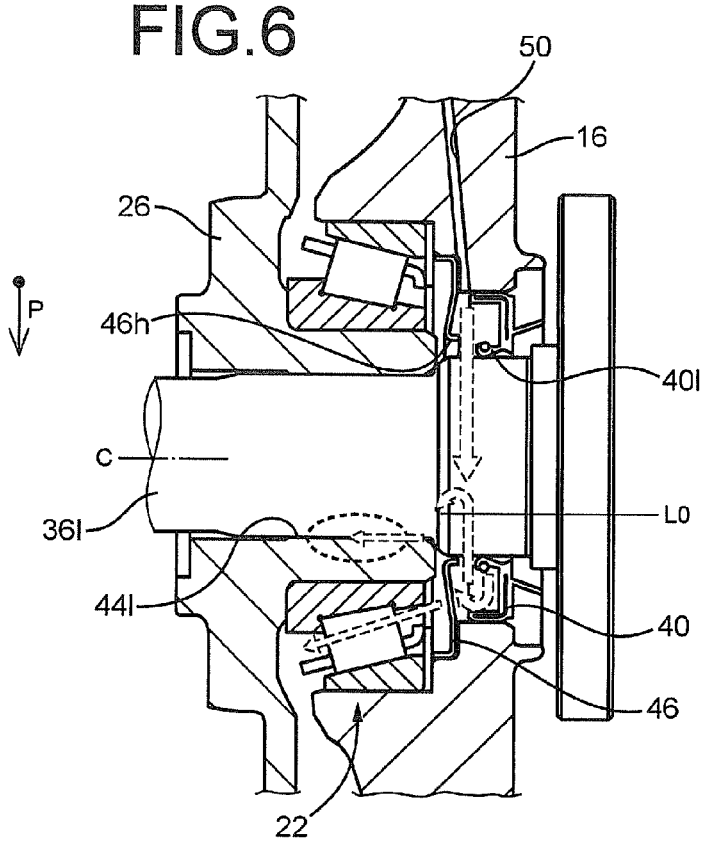
FIG. 6 is a diagram for explaining an effect of the configuration of the embodiment depicted in FIG. 3 by comparison with the conventional technique depicted in FIG. 5.

FIG. 6 is a diagram for explaining an effect of the differential device 10 of the embodiment by comparison with the conventional technique depicted in FIG. 5. In the differential device 10 of the embodiment disposed with the oil sump member 46 as described above, the oil supplied from the oil supply channel 50 follows a path indicated by a white arrow of a dashed line depicted in FIG. 6 and is supplied between the oil sump member 46 and the oil seal 40 and accumulated in the oil chamber 52 formed therebetween. If the oil surface of the oil accumulated in the oil chamber 52 exceeds the oil level L0 described above with reference to FIG. 4, the oil goes over the oil sump member 46 and is supplied from the relatively wide gap between the drive shaft 36l and the insert hole 46h to the side of the differential case 26, and the oil is supplied to the drive shaft bearing portion surrounded by a dashed line, i.e., between the through-hole 44l of the differential case 26 into which the drive shaft 36l is inserted and the drive shaft 36l. Since the insert hole 46h is formed with a wider inner diameter on the vertically upper side than the vertically lower side of the drive shaft 36l, the oil supply to the drive shaft bearing portion can be achieved in close proximity to a necessary site, thereby realizing efficient lubrication through stable supply of oil.

According to this embodiment, since the oil sump member 46 is included on the opposite side of the differential case 26 to the bearing 22 and includes the insert hole 46h into which the drive shaft 36l is inserted and at least a portion of the insert hole 46h is formed such that a gap between the insert hole 46h and the drive shaft 36l becomes wider than a gap on the vertically lower side of the rotational axis C of the drive shaft 36l, the oil sump member 46 can restrain the oil supplied on the lower side of the drive shaft 36l from being excessively sucked by the bearing 22 and sufficient oil can be supplied between the drive shaft 36l and the through-hole 44l of the differential case 26 with the oil sump member 46 as a guide. Therefore, the vehicle differential device 10 enabling efficient lubrication of the drive shaft bearing portion can be provided.

As compared to the conventional configuration as depicted in FIG. 5, the effect can be produced by disposing the oil sump member 46 of a simple configuration without newly disposing an oil supply channel or making a change in software such as adjustment of oil amount and, therefore, effects such as reducing man-hours of development can also be achieved. Particularly, as compared to a configuration disposed with a special oil introducing rib in the housing 16, cost reduction can be achieved by the configuration disposed with the oil sump member 46 that is an annular plate as a separate object and, since the oil sump member 46 is disposed only around the necessary site, an introducing rib etc., from the housing 16 are not necessary and weight saving of the device can advantageously be achieved.

Since the oil sump member 46 includes the discharge holes 54 allowing oil to flow out toward the differential case 26 if an oil level of the oil chamber 52 formed between the oil sump member 46 and the oil seal 40 exceeds a predetermined height, if oil is accumulated too much in the oil chamber 52, the oil can be released toward the differential case 26 to supply sufficient oil to another portion in need of lubrication.

Since the oil supply channel 50 formed higher than the drive shaft 36l in the vertical direction is included and the discharge holes 54 are formed at positions different from a site corresponding to the oil supply channel 50, the oil supplied from the oil supply channel 50 can be restrained from directly flowing into the discharge holes 54 and the oil chamber 52 can accumulate necessary and sufficient oil.

Although the preferred embodiment of the present invention has been described in detail with reference to the drawings, the present invention is not limited thereto and is also implemented in other forms.

Figure 7:
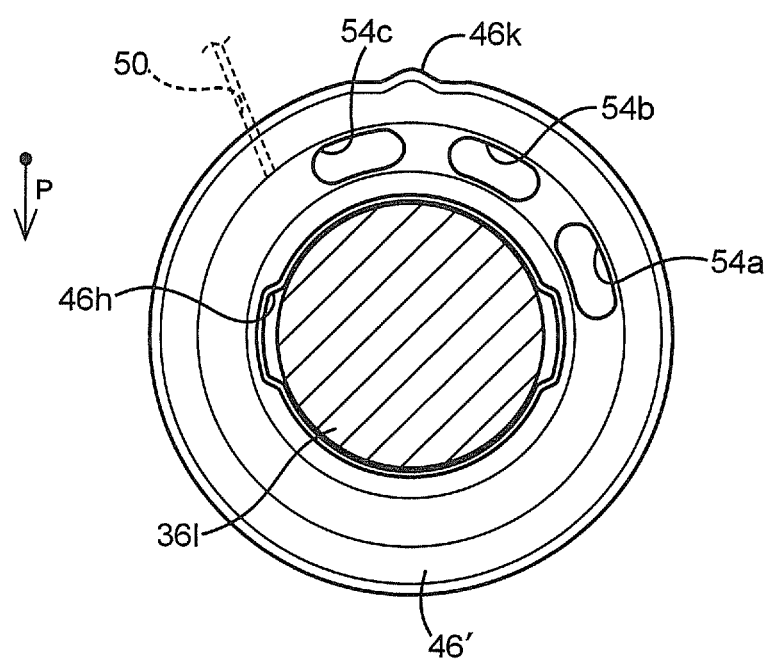
FIG. 7 is a diagram for depicting another configuration example of an oil sump member which is preferably applied to the vehicle differential device of FIG. 1.

For example, although the insert hole 46h formed in the oil sump member 46 is formed such that a gap between the insert hole 46h and the drive shaft 36l becomes wider on the vertically upper side of the rotational shaft center C of the drive shaft 36l than the vertically lower side in the embodiment, this is not limitation of the present invention and, for example, as in the case of an oil sump member 46' depicted in FIG. 7, a gap may be formed wider in sites corresponding to the both sides of the drive shaft 36l than the vertically lower side of the rotational axis C of the drive shaft 36l and may also be formed narrower on the vertically upper side of the rotational shaft center C. Therefore, a certain effect of the present invention is achieved as long as at least a portion of the insert hole 46h is configured with a larger diameter than that on the vertically lower side of the rotational axis C of the drive shaft 36l so as to efficiently supply oil to the drive shaft bearing portion.

Although the three discharge holes 54 are formed in the oil sump member 46 in the embodiment, the effect is achieved even if the number of the discharge holes 54 is two or one. The discharge holes 54 may not necessarily be provided if a gap between the insert hole 46h and the drive shaft 36l sufficiently acts as a discharge port for discharging the oil toward the differential case 26 when the oil level of the oil chamber 52 rises.

Although the embodiment has been described with an example of applying the present invention to the rear-wheel differential device 10 allocating a dive force to a pair of the rear wheels 12 acting as drive wheels, the present invention is obviously preferably applicable to a front-wheel differential device allocating a dive force to a pair of front wheels acting as drive wheels.

Although not exemplarily illustrated one by one, the present invention is implemented with various modifications applied without departing from the spirit thereof.

DESCRIPTION OF REFERENCE NUMERALS

10: vehicle differential device
12: rear wheels
14: input shaft
16: housing
18: bearing
20: small-diameter bevel gear
22, 24: bearings
26: differential case
28: large-diameter bevel gear
30: pinion shaft
32: side gears
34: pinion gears
36: drive shafts
38: oil seal
40, 42: oil seals
40l: rip portion
44: through-holes
46, 48: oil sump members
46h: insert hole
46k: key portion
50: oil supply channel
52: oil chamber
54: discharging holes

The invention claimed is:

1. A vehicle differential device having a differential case rotatably supported via a bearing by a housing and a drive shaft inserted into the differential case, comprising:
an oil sump member on the opposite side of the differential case to the bearing, the oil sump member including an insert hole into which the drive shaft is inserted, and
an oil supply channel formed higher than the drive shaft in the vertical direction, wherein
at least a portion of the insert hole is formed with a gap between the insertion hole and the drive shaft wider than that on the vertically lower side of the rotational axis of the drive shaft,
the oil sump member includes a discharge hole allowing oil to flow out toward the differential case if an oil level of an oil chamber formed between the oil sump member and an oil seal exceeds a predetermined height, the discharge hole being formed at a site corresponding to a phase circumferentially different from a site corresponding to the oil supply channel.

* * * * *